(12) United States Patent
Drost et al.

(10) Patent No.: US 6,304,098 B1
(45) Date of Patent: Oct. 16, 2001

(54) METHOD AND APPARATUS FOR REDUCING NOISE IN COMMUNICATION CHANNELS HAVING A SHARED REFERENCE SIGNAL

(75) Inventors: Robert J. Drost, Mountain View; Neil C. Wilhelm, Menlo Park, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/524,683

(22) Filed: Mar. 14, 2000

(51) Int. Cl.[7] ................................................. H03K 19/003
(52) U.S. Cl. ................................. 326/26; 326/30; 326/83
(58) Field of Search ................................. 326/21–23, 26, 326/27, 30, 80, 81, 83, 86

(56) References Cited

U.S. PATENT DOCUMENTS

| | | | |
|---|---|---|---|
| 4,217,553 | * | 8/1980 | Winebarger .............................. 326/26 |
| 5,977,795 | * | 11/1999 | Lee ......................................... 326/23 |
| 6,087,885 | * | 7/2000 | Tobita ..................................... 327/379 |

OTHER PUBLICATIONS

Mooney et al., "A 900 Mb/s Bidirectional Signaling Scheme", IEEE Journal of Solid–State Circuits, vol. 30, No. 12, pp. 1538–1543 (Dec. 1995).

Sidiropoulos et al., "A 700–Mb/s/pin CMOS Signaling Interface Using Current Integrating Receivers", IEEE Journal of Solid–State Circuits, vol. 32, No. 5, pp. 681–690 (May 1997).

* cited by examiner

*Primary Examiner*—Michael Tokar
*Assistant Examiner*—Don Phu Le
(74) *Attorney, Agent, or Firm*—Townsend and Townsend and Crew LLP

(57) ABSTRACT

Method and circuitry for improving noise immunity of differential data channels that use a shared reference channel by substantially matching their respective noise transfer functions. Any combination of various circuit parameters at the reference channel including termination resistance R, channel impedance Zo, and parasitic inductance L are scaled to substantially match the noise transfer function of the reference channel to that of the data channels.

26 Claims, 5 Drawing Sheets

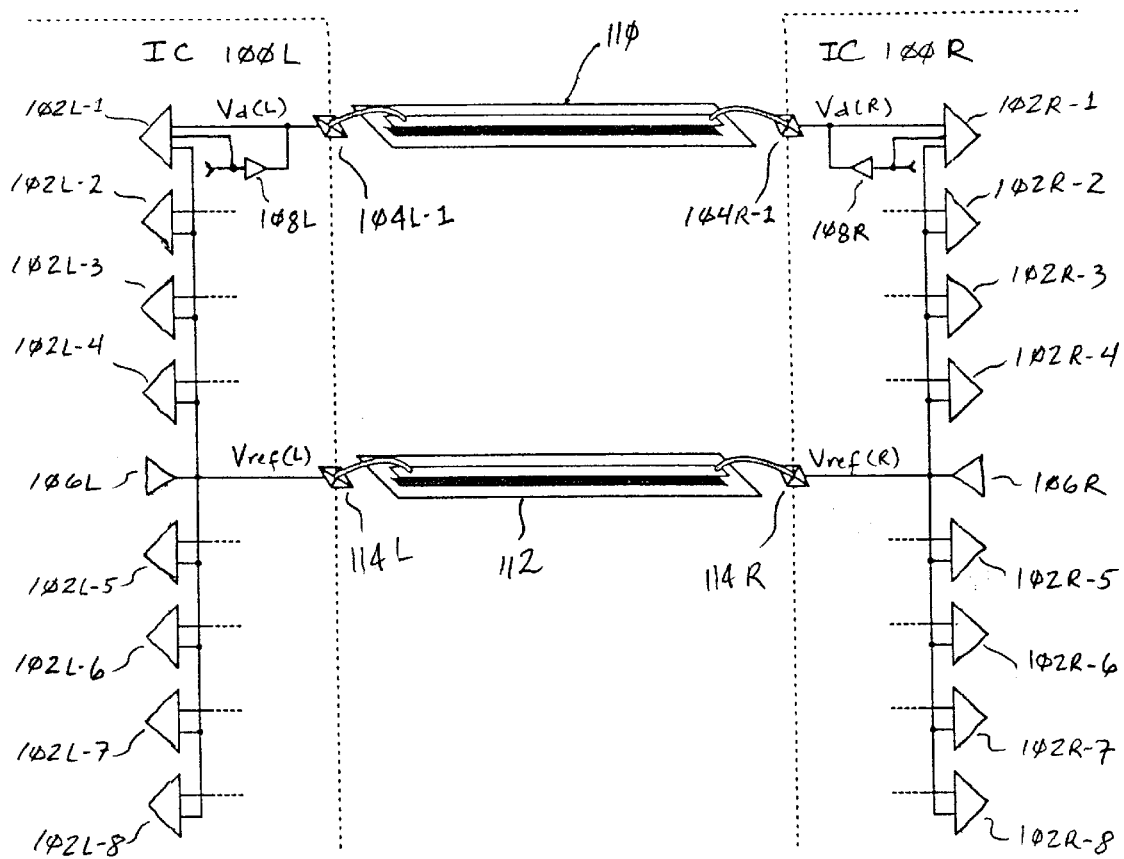
-FIG. 1-

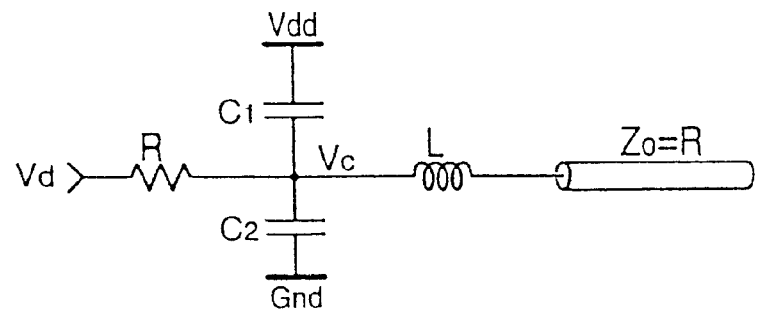
— FIG. 2A —
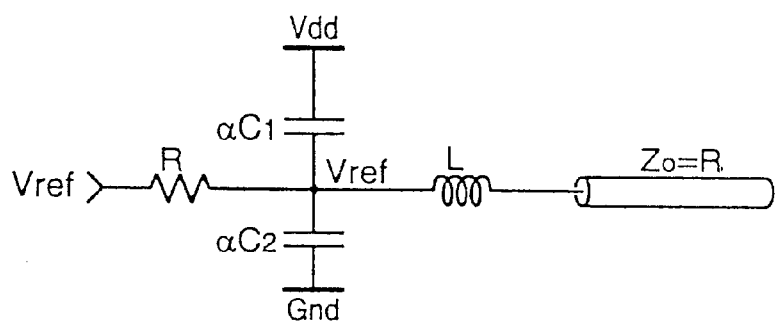
— FIG. 2B —
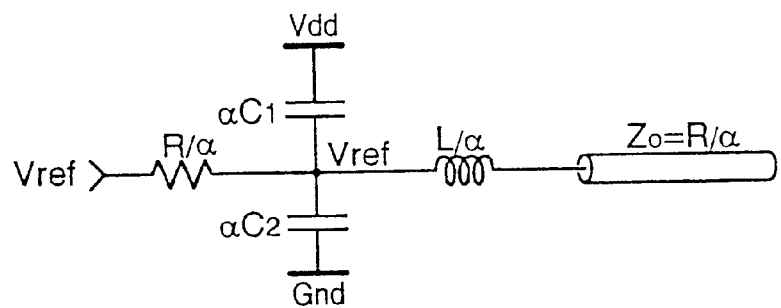
— FIG. 2C —

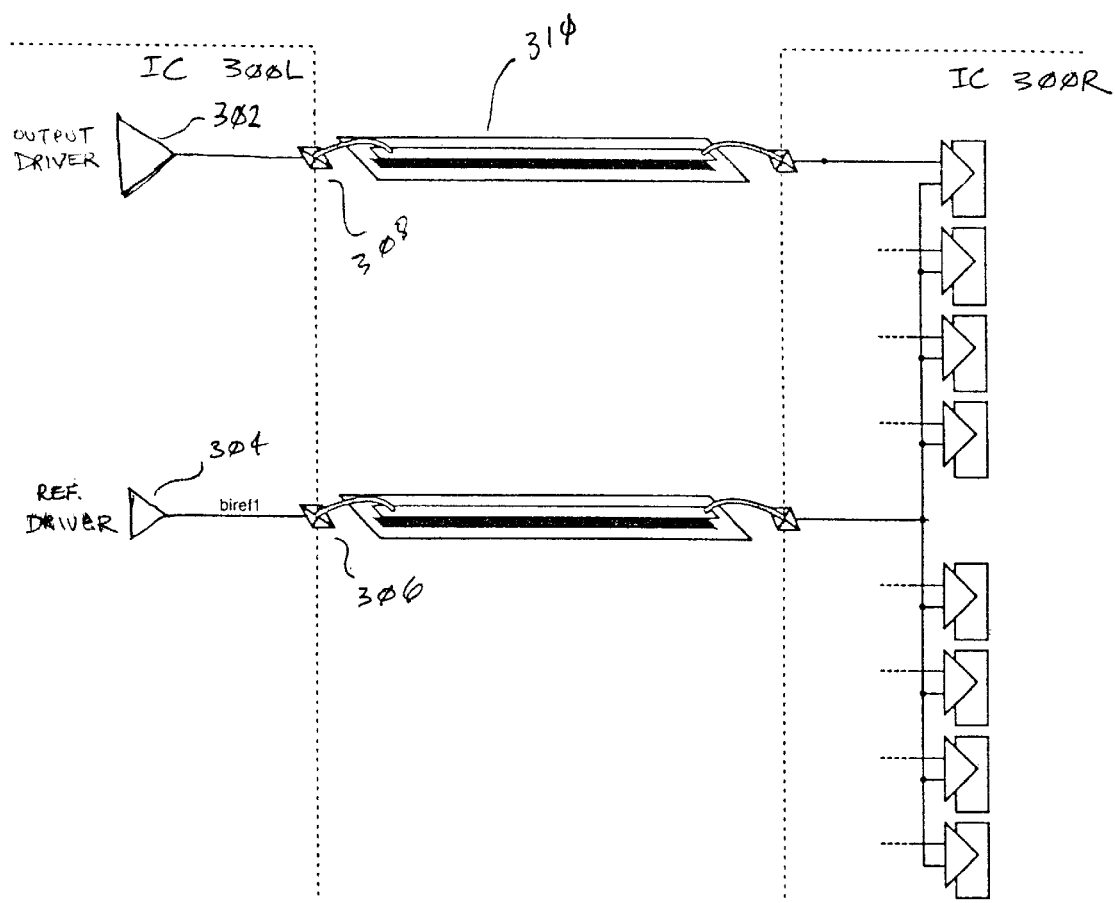
-FIG. 3-

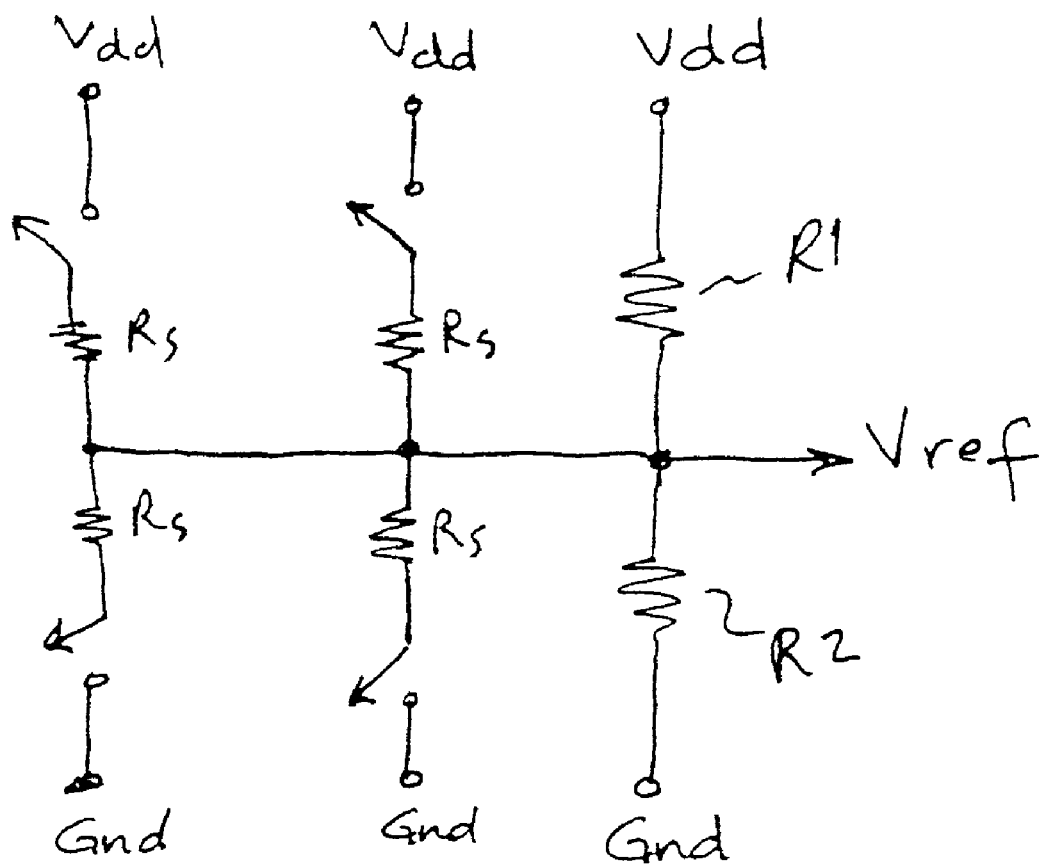
—FIG. 4—

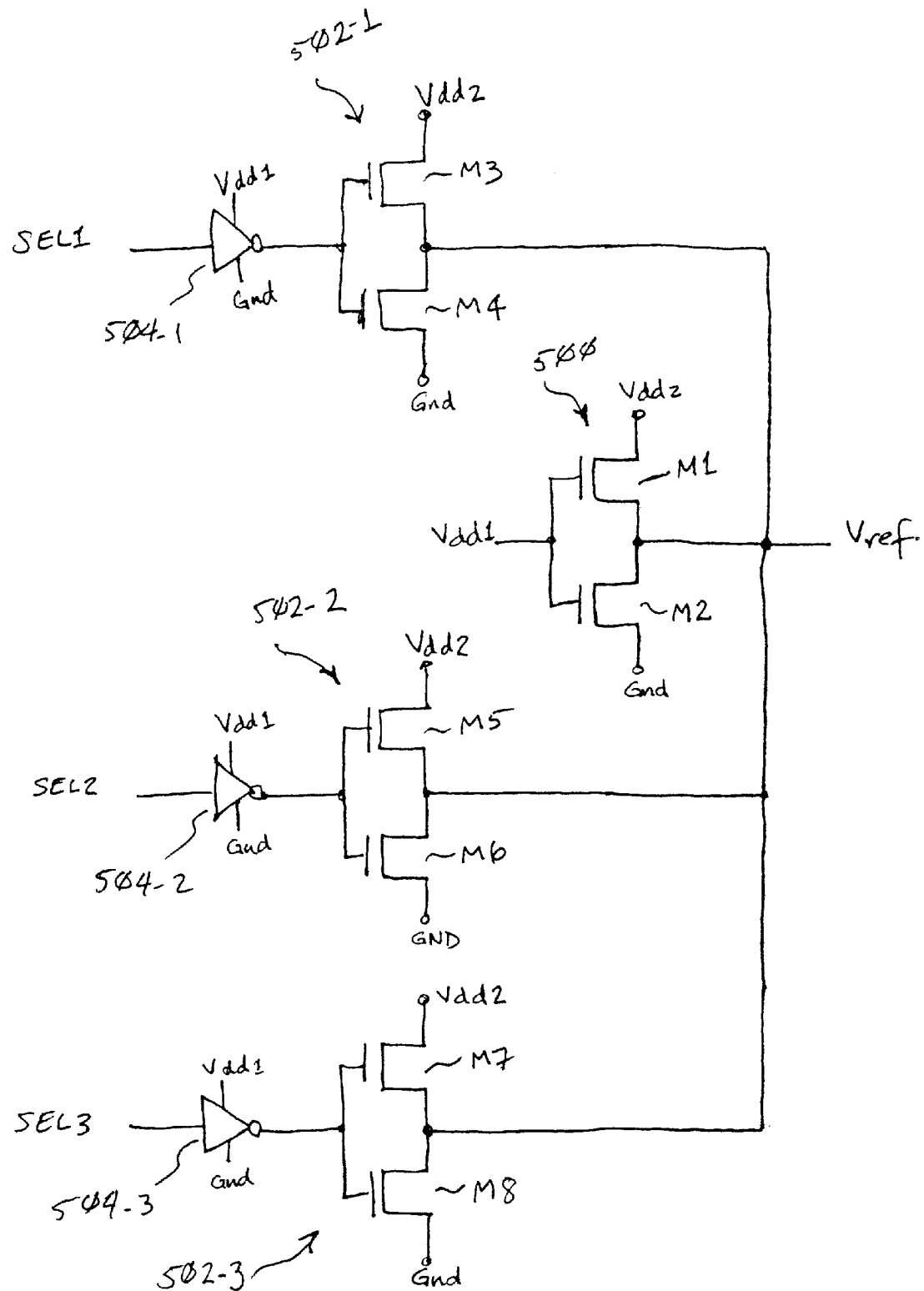
-FIG. 5-

METHOD AND APPARATUS FOR REDUCING NOISE IN COMMUNICATION CHANNELS HAVING A SHARED REFERENCE SIGNAL

BACKGROUND OF THE INVENTION

The present invention relates in general to data communication systems, and in particular to method and circuitry for providing differential immunity from noise sources in data communication channels that share a reference signal among multiple data signals.

Conventional differential signaling uses a pair of wires to transmit an electrical signal. Due to its differential nature, this type of signal transmission rejects common-mode noise sources and thus enjoys higher immunity to noise and crosstalk. Differential signaling, however, doubles the amount of I/O hardware and integrated circuit (IC) pin count per signal. This overhead becomes prohibitively costly in applications where the IC processes multiple parallel data channels. Differential signaling based on the same principles but using a single reference channel that is shared by multiple single-wire data channels has been developed to reduce the required hardware overhead while retaining the noise immunity advantages. This type of differential signaling, however, is not as effective in rejecting noise at higher frequencies. Due to the fact that the reference channel is routed and connected to multiple input circuits, while a given data channel is routed and connected only to its one dedicated input circuit, inherent physical differences exist between the data channels and the share reference channel. These differences contribute to the mismatch between the parasitic capacitive loading of the data channels as compared to that of the shared reference channel. As a result, high frequency noise sources couple differently in the data channels versus the reference channel, introducing differential noise which reduces the signal to noise ratio for the communication system.

Accordingly, there is a need for method and circuitry to further improve the noise immunity of differential transmission at higher frequencies.

SUMMARY OF THE INVENTION

The present invention improves noise immunity of differential data channels that use a shared reference channel, by substantially matching their respective noise transfer functions. The invention takes advantage of the fact that noise from noise sources (e.g., power buses) do not couple into a signal based on the value of a single circuit component but rather based on the ratios of circuit components as determined by the transfer function from the noise source to the signal under attack. By substantially matching the transfer function from noise source to shared reference signal to the transfer function from noise source to data signals, the present invention improves noise immunity for the shared reference signaling to levels comparable to the ideal case of a dedicated data/reference pair. For example, although the parasitic capacitance of the reference channel is higher due to the extra routing and loading, an exemplary embodiment of the present invention reduces the reference channel's termination resistance and transmission line impedance to maintain a constant RC time constant for the noise transfer function. The noise transfer function typically includes other parameters such as inductance due to the packaging of the integrated circuit (e.g., bond-wire and lead frame). This allows the application of the same principle to the remaining components of the reference channel noise transfer function until it matches the data channel noise transfer function for all frequencies.

Accordingly, in one embodiment, the present invention provides a method of reducing noise for a communication system wherein data transmission occurs over a plurality of data channels that share a reference channel, the method including a step of substantially matching a transfer function of noise from a noise source to the reference channel, to a transfer function of noise from a noise source to one of the plurality of data channels. The substantially matching step includes a step of reducing a termination resistance of the reference channel. The substantially matching step further includes a step of reducing an impedance of the reference channel transmission line.

In another embodiment, the present invention provides an integrated circuit including an output data driver coupled to drive a data signal onto an external data pin, and a reference signal driver coupled to drive a reference signal onto an external reference pin, wherein information is conveyed by the data signal in relation to the reference signal, and wherein the reference signal driver is configured to have a programmable output impedance. In a specific embodiment, the reference signal driver includes a plurality of parallel-coupled resistive elements that are programmably coupled to the external reference pin. The plurality of parallel-coupled resistive elements include field effect transistors coupled between the external reference pin and a power bus. The field effect transistors are biased to operate in linear region.

A better understanding of the nature and advantages of the noise transfer matching technique of the present invention may be gained with reference to the following detailed description and the accompanying drawings.

BRIEF DESCRIPTION OF THE DRAWINGS

FIG. 1 illustrates a communication system having two data processing integrated circuits communicating over multiple bi-directional data channels that share a single bi-directional reference channel;

FIGS. 2A and 2B are simplified circuit schematics showing the equivalent RLC loading at the data pin and an unmatched reference pin, respectively;

FIG. 2C is a simplified circuit schematic showing the equivalent RLC loading at the reference pin with components weighted to match noise transfer function according to the present invention;

FIG. 3 illustrates a communication system having two data processing integrated circuits communicating over multiple unidirectional data channels that share a single unidirectional reference channel;

FIG. 4 shows a highly simplified reference voltage generator that allows for the scaling of the termination resistance for the purposes of noise transfer matching according to the present invention; and FIG. 5 shows an exemplary circuit implementation for a reference signal driver with programmable output impedance according to one embodiment of the present invention.

DESCRIPTION OF THE SPECIFIC EMBODIMENTS

Referring to FIG. 1, there is shown a bi-directional communication system including two data processing integrated circuits (ICs) 100L and 100R that employ differential signaling. Each IC 100 includes multiple input buffers 102 with each input buffer 102 receiving, at one input, an input data signal from a respective I/O pin 104 and, at another input, a reference signal Vref from a shared reference driver 106. Shared reference driver 106 also drives its output reference signal Vref onto a reference pin 114. An I/O pin 104 is driven by an output driver 108. Each I/O pin 104 has a dedicated output driver 108. In a preferred embodiment, input buffer 102 is configured to cancel the outgoing signal driven by its corresponding output driver 108. Multiple bits of data are transmitted in parallel in a bi-directional manner between IC 100L and 100R via data channels 110 that connect between I/O pins 104. A reference channel 112 connects reference pins 114L and 114R.

The system of FIG. 1 is used herein as an example to illustrate a communication medium that exhibits intrinsic differences in the physical characteristics between a data channel and the shared reference channel. As shown in FIG. 1, the amount of parasitic loading at each data pin 104 is determined by its respective output driver 108, a single input buffer 102, the packaging parasitics (wire bond, lead frame, etc.), and data channel 110 loading. The parasitic loading at each reference pin 114, on the other hand, is determined by its respective reference driver 106 and multiple input buffers 106, the packaging parasitics and reference channel 112 loading. This results in an inherent imbalance in the amount of parasitic capacitance that is present on the data node (at pin 104) as compared to the parasitic capacitance on the reference node (pin 114). This difference is better illustrated by the simplified circuit schematics of FIGS. 2A and 2B showing the equivalent RLC loading at data pin 104 and reference pin 114, respectively. A data signal Vd that is being applied onto a data pin (104) drives a load that includes the termination resistance R (i.e., output impedance of its driver circuit 108), parasitic capacitance C1 coupled to the positive power supply Vdd, parasitic capacitance C2 coupled to the negative power supply or ground, packaging parasitic inductance L and channel impedance Zo that is matched by termination resistance R (i.e., Zo=R). Labeling the signal on the pin that is being applied to the channel as Vc, the s-domain transfer function of noise from ground (Gnd) to Vc can be given by:

$$\frac{Vc}{V(Gnd)} = \frac{s\frac{C1R}{2}\left(1+\frac{sL}{R}\right)}{s\left(\frac{CR}{2}+\frac{L}{2R}\right)+1+s^2\frac{LC}{2}} \quad \text{where, } C = C1 + C2; \quad \text{Eqn. (1)}$$

Referring now to FIG. 2B, a similar circuit showing the effective RLC loading at a conventional reference pin 114 is depicted. The components that are most affected by the physical differences between a data node and a reference node are the parasitic capacitors C1 and C2. Because Vref drives multiple input buffers 102, these parasitic capacitors are larger by a factor of α. The s-domain transfer function of noise from ground to Vref is thus given by:

$$\frac{Vref}{V(Gnd)} = \frac{s\frac{\alpha C1R}{2}\left(1+\frac{sL}{R}\right)}{s\left(\frac{\alpha CR}{2}+\frac{sL}{2R}\right)+1+s^2\frac{\alpha LC}{2}} \quad \text{Eqn. (2)}$$

FIG. 2C illustrates at a conceptual level the noise transfer matching concept of the present invention. The RLC loading for this exemplary reference channel is modified for an ideal matching of the noise transfer functions of the data and reference channels. In this simplified example, all other components that contribute to noise are scaled down by the factor α. Accordingly, the s-domain transfer function of noise from ground to Vref for a matched reference channel, according to one embodiment of the present invention, is given by:

$$\frac{Vref}{V(Gnd)} = \frac{s\frac{C1R}{2}\left(1+\frac{sL}{R}\right)}{s\left(\frac{CR}{2}+\frac{L}{2R}\right)+1+s^2\frac{LC}{2}} \quad \text{Eqn. (3)}$$

By thus matching the noise transfer functions as shown by equations (1) and (3), the present invention substantially eliminates differential noise. It is to be understood that the bi-directional communication system of FIG. 1 is used herein for illustrative purposes only, and that the noise transfer matching concept of the present invention may be applied to different types of communication systems where a reference channel is shared by multiple data channels. FIG. 3, for example, shows a unidirectional communication systems wherein IC 300L transmits data to IC 300R using the differential signaling of the type discussed herein. In this example, data channel 310 is unidirectional with IC 300L only transmitting data and not receiving data over channel 310, while IC 300R receives data without having the capability to transmit back onto the same channel (310). The same noise transfer matching can be used in the unidirectional system of FIG. 3, wherein the parasitics present at the reference node (pin 306), are scaled to substantially match its noise transfer function to that of the data node 308. Other types of communications systems can similarly benefit from the noise matching technique of the present invention. Furthermore, the transfer functions analyzed herein assume ground as the source of noise. The same noise transfer matching principles can be applied with the positive power supply being considered as the primary source of noise.

The matching of the noise transfer functions, in practice, is implemented by varying those circuit components that impact the RLC attendant at, preferably, the reference channel. The termination resistance R can be varied, for example, by having parallel-connected resistors that are digitally switchable. FIG. 4 shows a highly simplified reference voltage generator wherein a fixed resistive divider includes resistors R1 and R2 coupled between the positive power supply Vdd and ground GND, to generate Vref. A series of switchable resistors Rs are connected in parallel to R1 and R2. The switches can then be configured to achieve a desired scaling of the total output resistance Rout=R/α.

The transmission line impedance (Zo) for the reference channel can also be adjusted to a desired value by, for example, varying the width and/or the height (or thickness) of the stripline (e.g., 112 in FIG. 1) on the printed circuit board (PCB) that connects the two ICs. For more accurate scaling of the reference channel transmission line impedance, if for example a factor of two or three is desired, the transmission line can be replicated and then two or three identical transmission lines can be connected in parallel to achieve Zo/2 or Zo/3.

Since most of the parasitic inductance is due to the packaging of the IC, scaling the inductance parameter L requires modifying an aspect of the IC package. This includes, for example, the number or size (e.g., length) of pins used for the reference pin (114 in FIG. 1), or the number of wire bonds used to connect the reference pin to the reference pad on the IC. To obtain a factor of, for example, two or three reduction in inductance, two or three pins can be used for the reference channel. This of course would be costly in terms of pin count. A more cost-effective approach to scaling reference channel inductance is to multiple-bond the reference pad, and/or to use a shorter reference pin in the package such as middle pins of a dip or quad flat pack, or the inside pins of a pin grid array or ball grid array package.

In some applications it may be advantageous to not match the noise transfer functions exactly. For instance in chip to chip communication systems it is relatively easy and inexpensive to change termination resistances. Scaling only the reference channel termination resistance R is less costly as it can be readily implemented at the internal reference generator circuitry as shown in FIG. 4, without involving modifications to the packaging or PCB striplines and channel impedances. Package inductances may be difficult or expensive to modify. In such applications only parts of the transfer function can be modified which may result in a less than perfect matching of the noise transfer functions. In many applications, this will still provide a very useful enhancement of the noise rejection properties of the system, while incurring very little additional expense.

Referring to FIG. 5, there is shown an exemplary circuit implementation for a reference signal driver that allows for scaling of its output impedance. In this example, field effect transistors are used to implement fixed and switchable resistors. A fixed resistive divider 500 is provided by n-channel transistors M1 and M2 that are serially connected between a power supply node Vdd2 and ground with their gate terminals connected together in the form of a conventional inverter. Transistors M1 and M2, however, do not form an inverter, and instead have their gate terminals connected to a reference voltage, or another power supply node Vdd1. The voltage levels at Vdd1 and Vdd2 are set such that n-channel transistors M1 and M2 are turned on and operate in their linear region. These transistors thus effectively act as resistors, and by selecting appropriate channel sizes, the voltage level at Vdd2 is accurately divided to the desired Vref level. Transistors M1 and M2 are preferably designed to physically match driver transistors used in the output buffer (108 in FIG. 1) that drives the data channel.

The output impedance Rout (or the reference channel termination resistance) of divider 500 is given by the channel resistance of transistor M1 (RM1) in parallel with the channel resistance of transistor M2 (RM2). To scale output impedance Rout, the present invention provides one or more switchable resistive dividers 502 that connect to the Vref node in parallel with divider 500. Each switchable divider 502 includes a pair of n-channel transistors that are preferably identical to transistors M1 and M2. Instead of connecting to a reference signal, however, the gate terminals of the n-channel transistors in switchable dividers 502 are driven by an inverter 504. Inverter 504 is, for example, a conventional CMOS inverter that runs off of the higher power supply voltage Vdd1. Inverters 504 are controlled by select signals SEL-i. Thus, when SEL-1 is low, the output of inverter 504-1 is at Vdd1 activating transistors M3 and M4. The effective impedance at Vref is thus lowered to [(RM1∥RM3)∥(RM2∥RM4)]. If transistor sizes for M1/M3 and M2/M4 are identical, Rout is reduced by half. Further reduction in the value of Rout is possible by applying a logic low SEL signal to inverters 504-2 and 504-3. It is to be understood that the circuit shown in FIG. 5 is for illustrative purposes only and that there exist many variations on the implementation shown in FIG. 5. For example the number of switchable resistors 502 can vary depending on the desired resolution of the scaling increment. Each transistor in a divider may be provided with a separate control signal at its gate terminal to allow for separate control of channel resistance connecting from Vref to ground versus Vref to Vdd2. Also, p-channel transistors may be used instead of, or in combination with, n-channel transistors to implement the dividers. Furthermore, more than one fixed divider 500 may be required to match the specific requirements of the data channel output buffer.

In conclusion, the present invention provides method and circuitry for improving noise immunity of differential data channels that use a shared reference channel by substantially matching their respective noise transfer functions. Various circuit parameters at the reference channel including termination resistance R, channel impedance Zo, and parasitic inductance L are scaled to substantially match the noise transfer function of the reference channel to that of the data channels. Any combination of the RLC can be scaled depending on the application. In one embodiment, the termination resistance at the reference channel is scaled by a programmable reference circuit. While the above is a complete description of specific embodiments of the present invention, it is possible to use various alternatives, modifications and equivalents. Therefore, the scope of the present invention should be determined not with reference to the above description but should, instead, be determined with reference to the appended claims, along with their full scope of equivalents.

What is claimed is:

1. In a communication system wherein data transmission occurs over a plurality of data channels that share a reference channel, a method of reducing noise comprising a step of substantially matching a transfer function of noise from a noise source to the reference channel, to a transfer function of noise from a noise source to one of the plurality of data channels.

2. The method of claim 1 wherein the substantially matching step comprises modifying any combination of one or more of a termination resistance of the reference channel, a transmission line impedance of the reference channel, or an inductance associated with the reference channel.

3. The method of claim 2 wherein the substantially matching step comprises modifying any combination of one or more of width, thickness, height, or other dimensional or dielectric properties of the reference channel.

4. The method of claim 2 wherein the step of modifying the inductance associated with the reference channel comprises modifying physical characteristics of a package housing circuitry coupled to the reference channel.

5. The method of claim 4 wherein the step of modifying physical characteristics of the package comprises any combination of one or more of the following: coupling a package pin to the circuitry using two or more bond wires, coupling two or more package pins in parallel to the reference channel, using lower inductance package pins.

6. The method of claim 2 wherein the substantially matching step comprises a step of programmably scaling the termination resistance of the reference channel by providing a fixed resistive voltage divider coupled in parallel to a switchable resistive voltage divider.

7. The method of claim 3 wherein the step of scaling an impedance of the reference channel transmission line comprises a step of coupling one or more transmission lines in parallel to the reference transmission line, each additional transmission line substantially replicating the reference transmission line.

8. An integrated circuit comprising:
   an output data driver coupled to drive a data signal onto an external data pin; and
   a reference signal driver coupled to drive a reference signal onto an external reference pin, wherein, information is conveyed by the data signal in relation to the reference signal, and wherein, the reference signal driver is configured to have a programmable output impedance that is scaled to substantially match a transfer function from a noise source to the reference signal to a transfer function from the noise source to the data signal.

9. The integrated circuit of claim 8 wherein the reference signal driver comprises:

a fixed resistive divider coupled to a first voltage source and configured to divide a voltage level at the first voltage source to generate the reference signal; and a switchable resistive divider coupled to the first voltage source and the external reference pin.

10. The integrated circuit of claim 9 wherein each of the fixed resistive divider and the switchable resistive divider comprises a first field effect transistor coupled between the external reference pin and the first voltage source, wherein the first field effect transistor is biased to operate in linear region.

11. The integrated circuit of claim 10 wherein each of the fixed resistive divider and the switchable resistive divider further comprises a second field effect transistor coupled between the external reference pin and ground, wherein the second field effect transistor is biased to operate in linear region.

12. The integrated circuit of claim 11 wherein the noise source comprises ground.

13. The integrated circuit of claim 11 wherein the noise source comprises the first voltage source.

14. The integrated circuit of claim 11 wherein the first and the second field effect transistors are of n-channel type, and wherein their gate terminals couple together.

15. The integrated circuit of claim 14 wherein the gate terminals of the first and second n-channel field effect transistors in the fixed resistive divider selectively couple to a second voltage source having a voltage level higher than that of the first voltage source.

16. The integrated circuit of claim 15 wherein the gate terminals of the first and second n-channel field effect transistors in the switchable resistive divider couple to a respective select signal.

17. A communication system comprising:

a first data processing chip having an output driver configured to drive a data signal on a data pin and a reference driver configured to drive a reference signal on a reference pin, wherein information is conveyed by the data signal in relation to the reference signal;

a second data processing chip having a plurality of input buffers configured to receive, at a first input, a respective data signal from a respective data pin, and at a second input, a shared reference signal from a reference pin;

a data transmission line connecting the data pin of the first data processing chip to a data pin of the second data processing chip; and a reference transmission line connecting the reference pin of the first data processing chip to the reference pin of the second data processing chip, wherein, noise is reduced by matching a transfer function from a noise source to the reference signal to a transfer function from the noise source to the data signal.

18. The communication system of claim 17 wherein the reference driver comprises:

a fixed resistive divider coupled to a first voltage source and configured to divide a voltage level at the first voltage source to generate the reference signal; and a switchable resistive divider coupled to the first voltage source and the reference pin, wherein, noise is reduced by modifying an output impedance of the reference driver using the switchable resistive divider.

19. The communication system of claim 18 wherein each of the fixed resistive divider and the switchable divider comprises a pair of field effect transistors.

20. The communication system of claim 17 wherein the first data processing chip further comprises a plurality of input buffers configured to receive, at a first input, a respective data signal from a respective data pin, and at a second input, the reference signal from the reference driver, and wherein, the second data processing chip further comprises a reference driver configured to drive the reference signal onto the reference pin.

21. The communication system of claim 17 wherein the reference transmission line is configured to exhibit an impedance that is lower than that of the data transmission line.

22. The communication system of claim 21 wherein the data transmission line comprises an interconnect wire, and the reference transmission line comprises two parallel-connected interconnect wires that are substantially identical to the interconnect wire of the data transmission line.

23. The communication system of claim 21 wherein dimensional or dielectric properties of the reference transmission line is scaled compared to that of the data transmission line to achieve desired relative impedance.

24. The communication system of claim 17 wherein noise is reduced by scaling an inductance of the reference transmission line.

25. The communication system of claim 24 wherein two or more bond wires couple the reference signal to the reference pin in the first data processing chip.

26. The communication system of claim 24 wherein two or more pins of the first data processing chip are utilized to couple the reference signal to the reference transmission line.

* * * * *